United States Patent
Lindsay et al.

(10) Patent No.: US 12,391,411 B2
(45) Date of Patent: Aug. 19, 2025

(54) METHOD AND SYSTEM FOR MULTI-OBJECT SPACE DEBRIS REMOVAL

(71) Applicant: Astroscale Holdings Inc., Tokyo (JP)

(72) Inventors: Michael Lindsay, Tokyo (JP); Takashi Iwai, Tokyo (JP)

(73) Assignee: Astroscale Holdings Inc, Tokyo (JP)

( * ) Notice: Subject to any disclaimer, the term of this patent is extended or adjusted under 35 U.S.C. 154(b) by 0 days.

(21) Appl. No.: 18/272,383

(22) PCT Filed: Sep. 30, 2021

(86) PCT No.: PCT/JP2021/036087
§ 371 (c)(1),
(2) Date: Jul. 14, 2023

(87) PCT Pub. No.: WO2022/153619
PCT Pub. Date: Jul. 21, 2022

(65) Prior Publication Data
US 2024/0116654 A1      Apr. 11, 2024

Related U.S. Application Data

(60) Provisional application No. 63/137,905, filed on Jan. 15, 2021.

(51) Int. Cl.
*B64G 1/64* (2006.01)
*B64G 1/00* (2006.01)
(Continued)

(52) U.S. Cl.
CPC ............ *B64G 1/646* (2013.01); *B64G 1/002* (2013.01); *B64G 1/1078* (2013.01);
(Continued)

(58) Field of Classification Search
CPC .... B64G 1/1078; B64G 1/646; B64G 1/6462; B64G 2004/005; B64G 1/4024;
(Continued)

(56) References Cited

U.S. PATENT DOCUMENTS 5,082,211 A * 1/1992 Werka ............... B64G 1/40
244/167
5,421,540 A * 6/1995 Ting ................. B64G 1/623
244/158.1
(Continued)

FOREIGN PATENT DOCUMENTS

EP 3121122 A1 1/2017
EP 3156336 A1 4/2017
(Continued)

OTHER PUBLICATIONS

"High-gain antenna." Dasch, E. (2005). A Dictionary of Space Exploration. : Oxford University Press. (Year: 2005).*
(Continued)

*Primary Examiner* — Joshua J Michener
*Assistant Examiner* — Michael B. Kreiner
(74) *Attorney, Agent, or Firm* — Maine Cernota & Curran

(57) ABSTRACT

According to an aspect of the present invention, there is provided a method for rendezvous with an orbiting object comprising: launching a tug and a servicer into a client orbit; separating the servicer from the tug; and docking the servicer with a client. According to another aspect of the present invention, there is provided system for rendezvous with an orbiting object comprising: a first spacecraft comprising a tug capable of towing a second spacecraft, wherein the second spacecraft is a servicer configured to dock with a tumbling client orbiting object.

17 Claims, 8 Drawing Sheets

(51) Int. Cl.
  *B64G 1/10* (2006.01)
  *B64G 1/14* (2006.01)
  *B64G 1/24* (2006.01)
  *B64G 1/40* (2006.01)
  *B64G 1/62* (2006.01)
  *B64G 1/66* (2006.01)

(52) U.S. Cl.
  CPC ............. *B64G 1/1081* (2023.08); *B64G 1/14* (2013.01); *B64G 1/242* (2013.01); *B64G 1/2427* (2023.08); *B64G 1/62* (2013.01); *B64G 1/645* (2013.01); *B64G 1/6462* (2023.08); *B64G 1/66* (2013.01); *B64G 1/4024* (2023.08)

(58) Field of Classification Search
  CPC .... B64G 1/1081; B64G 1/242; B64G 1/2427; B64G 1/62
  See application file for complete search history.

(56) References Cited

U.S. PATENT DOCUMENTS

| | | | |
|---|---|---|---|
| 5,803,407 A | 9/1998 | Scott | |
| 6,523,784 B2* | 2/2003 | Steinsiek | B64G 1/1081 244/172.6 |
| 6,655,637 B1* | 12/2003 | Robinson | B64G 1/2427 244/172.4 |
| 7,070,151 B2* | 7/2006 | D'Ausilio | B64G 1/1081 244/171.1 |
| 7,216,834 B2* | 5/2007 | D'Ausilio | G21D 5/02 244/172.5 |
| 7,370,834 B2* | 5/2008 | Scott | B64G 1/242 244/164 |
| 7,823,837 B2* | 11/2010 | Behrens | B64G 1/6464 244/172.4 |
| 7,861,975 B2* | 1/2011 | Behrens | B64G 1/4024 244/172.4 |
| 8,074,935 B2* | 12/2011 | Gryniewski | B64G 1/14 244/172.4 |
| 8,205,838 B2* | 6/2012 | Moorer, Jr. | F03H 1/0006 244/158.6 |
| 8,226,046 B2* | 7/2012 | Poulos | B64G 1/646 244/172.4 |
| 8,464,983 B2* | 6/2013 | Knirsch | B64G 1/646 244/172.4 |
| 8,783,622 B2* | 7/2014 | Vance | B64G 1/6462 244/172.6 |
| 9,022,323 B2* | 5/2015 | Starke | B64G 1/6462 244/158.6 |
| 9,284,073 B2* | 3/2016 | Bigelow | B64G 1/1078 |
| 9,434,485 B1* | 9/2016 | Lehocki | B64G 1/403 |
| 9,463,883 B2* | 10/2016 | Bigelow | B64G 1/44 |
| 9,463,884 B2* | 10/2016 | Kitazawa | B64G 1/648 |
| 9,714,101 B1* | 7/2017 | Kaplan | B64G 1/10 |
| 9,840,342 B2* | 12/2017 | Chambert | B64G 1/6462 |
| 9,873,528 B2* | 1/2018 | Okada | F16D 63/00 |
| 10,309,798 B2 | 6/2019 | Maeda | |
| 10,407,184 B2* | 9/2019 | Mori | B64G 1/648 |
| 10,611,504 B2 | 4/2020 | Halsband | |
| 10,625,882 B2 | 4/2020 | Reitman | |
| 10,640,239 B2* | 5/2020 | Reed | B64G 1/62 |
| 10,723,490 B2 | 7/2020 | Rasse | |
| 10,882,643 B2 | 1/2021 | Okada | |
| 11,117,683 B2 | 9/2021 | Reitman | |
| 11,440,685 B2* | 9/2022 | Goff | B64G 1/6462 |
| 11,643,227 B2* | 5/2023 | Halsband | B64G 1/4282 244/172.5 |
| 12,202,627 B2* | 1/2025 | Belieres Montero | B64G 1/6462 |
| 2006/0145024 A1 | 7/2006 | Kosmas | |
| 2013/0075534 A1* | 3/2013 | Taylor | B64G 1/646 244/158.6 |
| 2013/0119204 A1 | 5/2013 | Allen | |
| 2013/0175401 A1 | 7/2013 | Starke | |
| 2017/0015444 A1* | 1/2017 | Okada | B64G 1/36 |
| 2017/0081051 A1 | 3/2017 | Okada | |
| 2018/0229865 A1 | 8/2018 | Maeda | |
| 2018/0367192 A1 | 12/2018 | O'Shea | |
| 2019/0023420 A1 | 1/2019 | Nicholson | |
| 2019/0023421 A1 | 1/2019 | Nicholson | |
| 2019/0023422 A1 | 1/2019 | Nicholson | |
| 2019/0341721 A1 | 11/2019 | Goff | |
| 2019/0359357 A1* | 11/2019 | Shimamura | B64G 1/648 |
| 2019/0367192 A1 | 12/2019 | Maeda | |
| 2021/0061494 A1* | 3/2021 | Belieres Montero | B64G 1/6462 |
| 2021/0086923 A1 | 3/2021 | Halsband | |
| 2021/0300597 A1 | 9/2021 | Clark | |
| 2023/0406546 A1* | 12/2023 | Iwai | B64G 1/1081 |
| 2023/0415923 A1* | 12/2023 | Scheidegger | B64G 1/6462 |
| 2024/0101280 A1* | 3/2024 | Lindsay | B64G 1/28 |

FOREIGN PATENT DOCUMENTS

| | | |
|---|---|---|
| JP | 08-244697 A | 9/1996 |
| JP | H09-511472 A | 11/1997 |
| JP | 2000-272600 A | 10/2000 |
| JP | 2003-212199 A | 7/2003 |
| JP | 2014-533216 A | 12/2014 |
| JP | 2015-174647 A | 10/2015 |
| JP | 2020-527504 A | 9/2020 |
| WO | WO 98/15030 | 5/1996 |
| WO | WO 1996/015030 | 5/1996 |
| WO | WO2013/071438 | 5/2013 |
| WO | WO 2019/018819 | 1/2019 |

OTHER PUBLICATIONS

Blackerby et al, ELSA-D: An In-orbit End-of-Life Demonstration Mission, IAC-18, Sep. 14, 2018.

Caubet, Albert et al., Design of an Attitude Stabilization Electromagnetic Module for Detumbling Uncooperative Targets, IEEE Aerospace Conf Proceedings, Mar. 2014, pp. 1-13.

International Search Report and Written Opinion mailed Dec. 21, 2021 in PCT/JP2021/036087.

USPTO Notice of Allowance in U.S. Appl. No. 17/574,641 mailed Sep. 16, 2024.

Pelton, J.; New Solution for the Space Debris Problem, 2015.

Udrea. B. et al, "A Cooperative Multi-Satellite Mission for Controlled Active Debris Removal from Low Earth Orbit", 2015 IEEE Aerospace Conf., Mar. 7, 2015.

* cited by examiner

METHOD AND SYSTEM FOR MULTI-OBJECT SPACE DEBRIS REMOVAL

TECHNICAL FIELD

This application is a national stage filing under 35 U.S.C. § 371 of international application PCT/JP2021/036087 entitled "Method and System for Multi-Object Space Debris Removal" filed Sep. 30, 2021 which claims priority to US Provisional Patent Application Serial No. 63/137,905 entitled "Method for Multi-Object Debris Removal" filed Jan. 15, 2021, both of which are incorporated herein in their entireties by reference.

Embodiments of the present invention relate to a method and system for multi-object space debris removal.

BACKGROUND ART

Aging satellites and space debris crowd low-Earth orbit, and regularly launching new satellites add to the collision risk.

Various methods, devices, and systems have been proposed for deorbiting obsolescent satellites and clearing other space debris. For example, the Patent Document 1 below proposes a device for stabilizing and deorbiting a satellite that comprises a pair of coplanar masts each carrying at least one membrane forming an aero banking sail, said masts being fixed to the satellite along non-parallel axes and each being provided, on the opposite end thereof to the end thereof fixed to the satellite, with a Mass for generating a gravity gradient and for which the masts form, with the bisectrix between the masts, a fixed angle adapted to align the bisectrix with the satellite velocity vector at any altitude.

CITATION LIST

Patent Literature

Patent Document 1
U.S. Pat. No. 10,723,490 B2

SUMMARY OF INVENTION

Technical Problem

Nevertheless, prior art methods and systems suffer from significant limitations, including the inability to safely and economically deorbit satellites and debris under some conditions.

In view of the above circumstances, aspects of present invention provide a method and system for multi-object space debris renewal that enable safer and/or more economical operation.

Solution to Problem

According to an aspect of the present invention, there is provided a method for rendezvous with an orbiting object comprising: launching a tug and a servicer into a client orbit; separating the servicer from the tug; and docking the servicer with a client.

According to another aspect of the present invention, there is provided system for rendezvous with an orbiting object comprising: a first spacecraft comprising a tug capable of towing a second spacecraft, wherein the second spacecraft is a servicer configured to dock with a tumbling client orbiting object.

DESCRIPTION OF EMBODIMENTS

Figure 1:
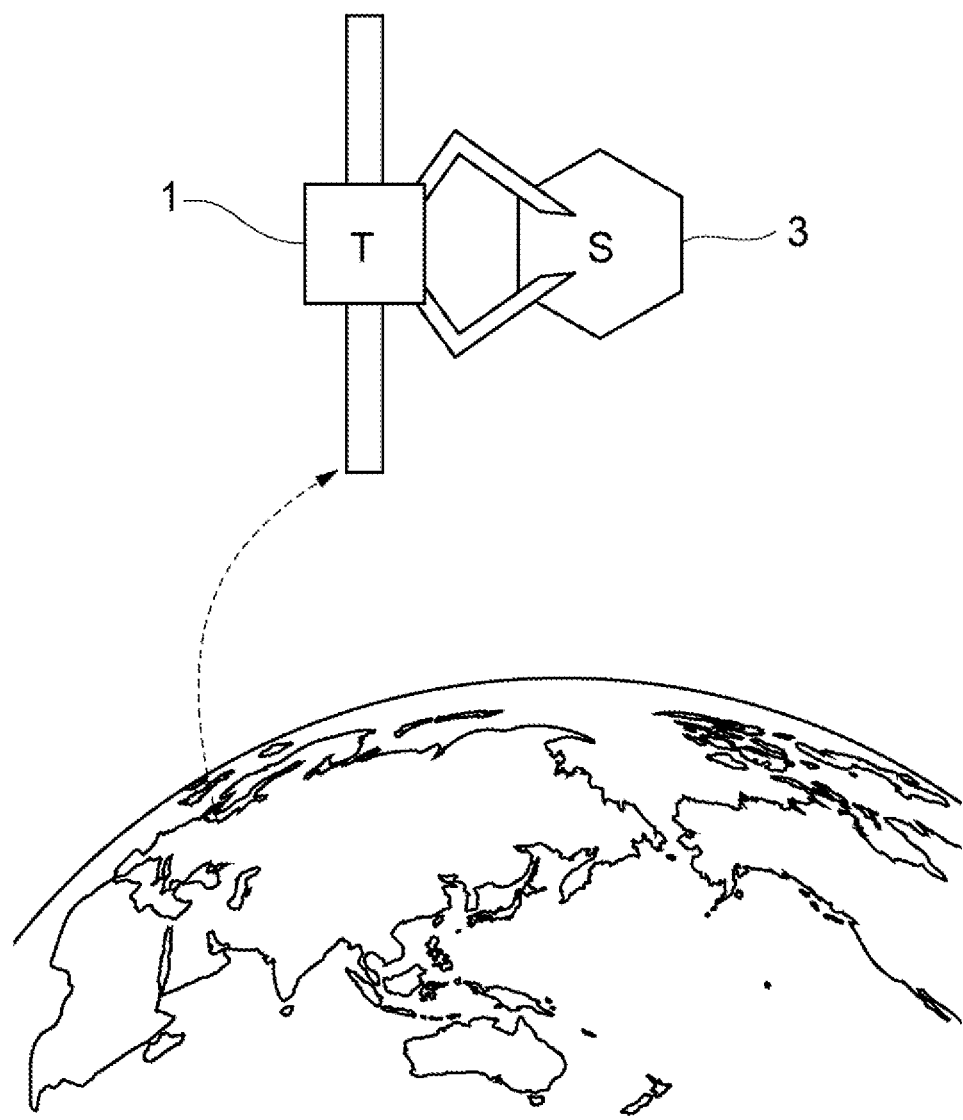
FIG. 1 illustrates the launch of a tug together with a servicer into orbit on a dedicated launch vehicle.

Embodiments illustrative of the present invention will be described with reference to the attached drawings. Note that constituents denoted by the same symbols have the same or similar configurations in respective figures.

As used herein, delta V is a measure of the impulse per unit of spacecraft mass that is needed to perform a maneuver such as an in-space orbital maneuver. It is a scalar that has the units of speed.

A multi-object space debris removal mission requires substantial amounts of delta V as well as the capability to rendezvous with and capture large tumbling objects and the capability to perform precisely targeted atmospheric reentry trajectories in order to minimize risk of harmful collisions with humans, animals, sensitive habitats and property situated on the surface of the Earth.

In a solution that utilizes a single, monolithic spacecraft for rendezvous, capture, and disposal, these requirements act against each other as described below.

Achieving high delta V can require massive stores of fuel and/or a very efficient propulsion system (high specific impulse, a measure of how efficiently fuel is utilized) such as solar electric propulsion, which in turn requires large deployed areas of solar cells with gimbaled control to track the sun vector for adequate power generation.

Rendezvous with and capture of large tumbling objects can require a low-mass and compact spacecraft with minimal deployed and/or protruding components so as to reduce rotational inertia and risk of collision. This allows for a more agile spacecraft that can cancel out its velocity and rotation relative to quickly tumbling debris objects while using less fuel. Fewer protruding components also reduces the combined hard-body collision radius of the spacecraft which allows for wider safe-approach angles required when capturing a debris object.

Performing precisely targeted atmospheric reentry trajectories in order to minimize risk of casualties on Earth can require that during atmospheric reentry, the surviving remnants of the debris object must only impact uninhabited regions on the surface of Earth. As the debris object has no ability to control its trajectory, this guidance must be provided by another spacecraft which may, as a result, burn in the atmosphere along with the debris object. Such a scenario can preclude reusability of this guiding spacecraft.

In engineering a spacecraft, achieving high delta V compels high mats and size, whereas capability for rendezvous with and capture of huge tumbling objects requires low mass and size. Both these requirements increase cost, whereas a spacecraft performing precisely targeted atmospheric reentry trajectories may burn in the atmosphere along with the debris object, driving the cost-per-use prohibitively high.

The problem to be solved is that it, is extremely difficult to design and build a single, monolithic spacecraft that has high delta V while also being nimble and inexpensive enough to be considered disposable. Meeting all three requirements is a unique challenge that has not yet been addressed satisfactorily.

Thus, an embodiment of the present invention provides a method of distributing the aforementioned required capabilities across multiple, independent spacecraft which work together to achieve the mission goals. Specifically, the embodiment utilizes a distributed architecture comprising more than one vehicle.

In FIG. 1, tug 1 is launched together with servicer 3 into orbit on a (wholly or partially) dedicated launch vehicle.

In embodiments, tug 1 provides substantial amounts of delta V requited for large orbit changes, rendezvousing with multiple objects, and re-orbiting massive debris objects. Tug 1 could be from several hundred kilograms up to a couple of tons in mass, devoting substantial masts fraction to fuel for electric propulsion (xenon or krypton). Tug 1 can also have multiple thrusters for increased thrust and redundancy, and a large tracking solar array with a wingspan of several meters to maximize solar power generation, which also increases thrust. Tug 1 may or may not include chemical propulsion which may be needed for docking operations only. Typical values for the specific impulse of tug 1 would be 1200 s-2000 s, ideally in the upper end of that range. Thrust generated by tug 1 can be between 60-240) mN depending on solar power generation and number of thrusters. Tug 1 can also have a very capable attitude/momentum control system that allows it to control a joint stack of multiple bodies that together comprise much more mass than the tug alone.

In embodiments, servicer 3 is small, light, agile, and designed for docking with both tumbling debris objects and stabilized operational spacecraft to either provide services (such as refueling or repair), detumble, or provide other forms of movement or attitude control to the client.

Servicer 3 could be between 200-400 kg, with mostly body mounted solar panels, and a diverse array of thrusters for maximum agility, typically around a few Newtons in thrust. The bus size should be around a meter cubed, but servicer 3 can also have a device for capture, be it a robotic arm, magnetic capture device, or some other type of interface. The propulsion of servicer 3 will be primarily chemical, but some embodiments of servicer 3 could also have electric propulsion.

Servicer 3 may be capable of operating in all attitude profiles as it approaches tumbling client 5. This makes a directional antenna for ground communication difficult to use, and as such, an omni-directional antenna can be used to close the communications link with the ground in any orientation. The drawback of an omni-directional antenna is that the gain is low, so achievable data rates are also low. Tug 1, however, does not need to do a tumbling capture, so it may have a directional antenna which allows for higher bandwidth communications. Since tug 1 can be in space in relatively close proximity to servicer 3, tug 1 can act as an intermediary comms relay, which allows servicer 3 to close a high-bandwidth data link to tug 1 using an omni-directional antenna, and then the high-bandwidth link to the ground can be enabled d via high gain antenna on tug 1. That way, servicer-to-ground communications can be higher throughput than it could be without tug 1.

There are many different expendable and recoverable launch vehicles in use that can be used to launch tug 1 and servicer 3. Currently, government and private parties in the United States and in other countries have developed a variety of launch vehicles, with each of the vehicles optimized for particular missions.

For example, the Atlas V and Delta IV module can be used to launch some embodiments. Vulcan Centaur is a successor to the Atlas V under development that includes some Delta IV technology and is expected to have similar capacity. In addition, certain smaller launch vehicles have been developed to launch lighter spacecraft at a lower overall cost, though they have not found a wide commercial market for their use.

Other launch vehicles potentially useful in embodiments include the Falcon family, which consists of three launch vehicles-Falcon 1. Falcon 9, and Falcon Heavy-built by the U.S. corporation SpaceX. Another privately developed launch vehicle which might be suitable in some embodiments is Virgin Orbit's LauncherOne, designed to launch a 300-kg payload to a 500-km altitude low-Earth orbit.

Figure 2:
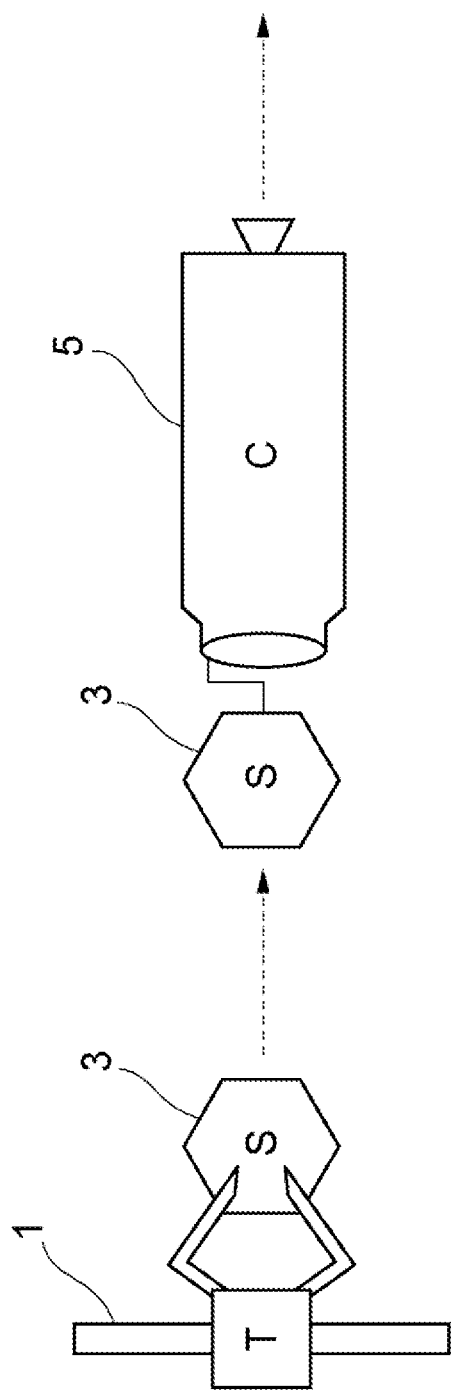
FIG. 2 illustrates separation of the servicer from the tug and contact by the servicer with a client desired to be deorbited.

FIG. 2 illustrates separation of servicer 3 from tug 1 and contact by servicer 3 with client 5 desired to be deorbited.

In some embodiments, client 5 is equipped an optical marker before being launched into space. The optical marker reflects light of a predetermined wavelength band radiated from a lighting device of servicer 3; an image of the optical marker which has reflected the light of the predetermined wavelength band is acquired by an image acquisition device of servicer 3; and the image is processed by an image processing device. As a result, servicer 3 can estimate the attitude of the target object.

In some embodiments, a capturing plate can be attached to client 5. The capturing plate can be attached to a part of client 5 where a capturing device bonds with a bonding component of servicer 3, with the bonding component including adhesive. The capturing plate is attached to client 5, whereby the bonding component of servicer 3 can be bonded to the capturing plate of client 5 easily and reliably regardless of the structure or the material of the outer surface of client 5. The capturing plate may include a guide structure to define the bonding position of client 5 with servicer 3. This can improve the accuracy in bonding position of client 5 with servicer 3.

In some embodiments, a set of capture arms extend from servicer 3 and operate to engage client 5, including: at least one servicer umbilical with a servicer umbilical first end attached to the servicer 3 and a servicer umbilical second end fitted with a servicer umbilical end connector, the servicer umbilical end connector configured to form a connection with a client umbilical connector of client 5; a manipulator arm with a manipulator arm first end coupled to servicer 3 and a manipulator arm second end configured to attach to and maneuver the servicer umbilical second end; and a processor operating to control the manipulator arm; wherein: the manipulator arm maneuvers the servicer umbilical second end to form a connection between the servicer umbilical end connector and the client umbilical connector.

In some embodiments, servicer 3 can include a variety of structures for providing an attachment to chant S. A rigid system of attachment hardware could include brackets, clamps, bolts, and screws. A non-rigid system could include a combination of tethers or elastic elements. "Lock and key" style elements may be attached to client 5 to facilitate the attachment process. For example, various forms of connectors could be attached to client 5 and then connected to the complementary part of tug 1.

Client 5 can vary across a wide range of sizes and shapes. Client 5 can be a small piece of debris less than 10 cm in diameter or client 5 can be a large satellite weighing many tons. There are millions of pieces of debris in Low Earth Orbit (between 800-2,000 km) where most satellites operate that are too small to be tracked. Around 35,000 pieces of space debris over 10 cm in diameter have been individually tracked. Around 9,000 satellites have been launched into Low Earth Orbit of which only about 2,000 are operational, with the majority of the remainder still orbiting. Around 60% of satellites in orbit are non-functional and undesirable debris.

About 24% of the individually tracked debris objects are obsolescent satellites, and about 18% are spent upper stages and mission-related objects such as launch adapters and lens covers. Even bits of space debris only 1 cm in diameter can harm a satellite because collision would occur at a high velocity. It is believed that a fragment of space debris larger than 1 centimeter is capable of penetrating the outer walls of existing satellites and spacecraft, which can cause catastrophic failure if the walls are not reinforced with additional layers.

A typical impact with space debris occurs at a closing velocity of 10 km/s, equal to 36,000 km/hr. An object needs to be accelerated to a velocity of around 7 km/s to stay in low Earth orbit. Velocities of objects in space are determined by the laws of physics and the gravitational field of the body around which the objects orbit. Objects can be found in many different orbits around the Earth, some travelling in the opposite direction to others.

Figure 3:
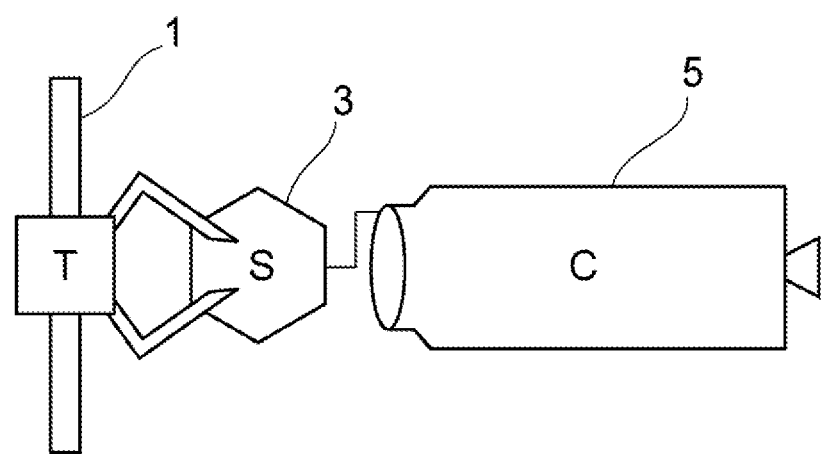
FIG. 3 illustrates docking by the tug with the servicer white the servicer maintains hold of the client.

FIG. 3 illustrates docking by tug 1 with servicer 3 while servicer 3 maintains hold of client 5.

Docking of spacecraft is the joining of two space vehicles. This connection can be temporary, or partially permanent such as for space station modules. Docking specifically refers to joining of two separate free-flying space vehicles. For orbital rendezvous to occur, both spacecraft must be in the same orbit, and the position and the rotation of the spacecraft in the orbit must be matched. Prior to docking tug 1 and servicer 3, the translational and angular speed of tug 1 and servicer 3 generally must be made equal.

To achieve the object, a rotation suppressing device can be supplied fix suppressing rotation of client 5, and can include: a body; a shaft extending outward from the body and configured to rotate about a first rotation axis; a rotation part attached to an end of the shaft opposite to the body and configured to rotate about a second rotation axis together with the shaft; a capture part fixed to the rotation part and configured to capture the target; a braking part provided in the body and configured to suppress rotation of the shaft; and a body rotation suppressing pan configured to suppress rotation of the body occurring when the braking part operates. The body rotation sup pressing part may be a reaction wheel provided inside the body, for example. With this configuration, the capture part can capture client 5, and the rotation part fixed to the capture part and the shaft attached to the rotation part can rotate together with client 5. Then, the braking part gradually suppresses rotation of the shaft, and the body rotation suppressing part suppresses rotation of the body occurring when the braking part operates. That is, the capture part, for example, rotates integrally with client 5, and this rotation is suppressed by the braking part, thereby suppressing rotation of the body occurring when the braking part operates (i.e., an angular momentum of client 5 is moved to the body rotation suppressing part and absorbed therein with the position of the body maintained). As a result, rotational motion of client 5 that is relatively large (has a large angular momentum) can be effectively suppressed.

Docking and berthing systems on tug 1, servicer 3, and client 5 may be either androgynous or non-androgynous, depending on the design of attachment pieces. Early systems for conjoining spacecraft were all non-androgynous docking system designs. Non-androgynous designs are a form of gender mating where each component of an interface to be joined has a unique design (e.g., "male" shape or "female" shape) and a specific role to play in the docking process. The roles cannot be reversed and two spacecraft with identical connecting attachments cannot be joined. An androgynous docking (and androgynous berthing) scheme by contrast uses an identical interface on all spacecraft so equipped, which can be used to connect the vehicles.

In embodiments, client 5 may lack any means of propulsion, such as if client 5 has no remaining fuel stores. Servicer 3 can guide the motion of client 5 to facilitate formation of a complex with tug 1 and service % 3 can be equipped with computerized control systems, which can use data gathered by scanning LIDAR ranging sensors and infrared and visible cameras in guiding motion of client 5.

Figure 4:
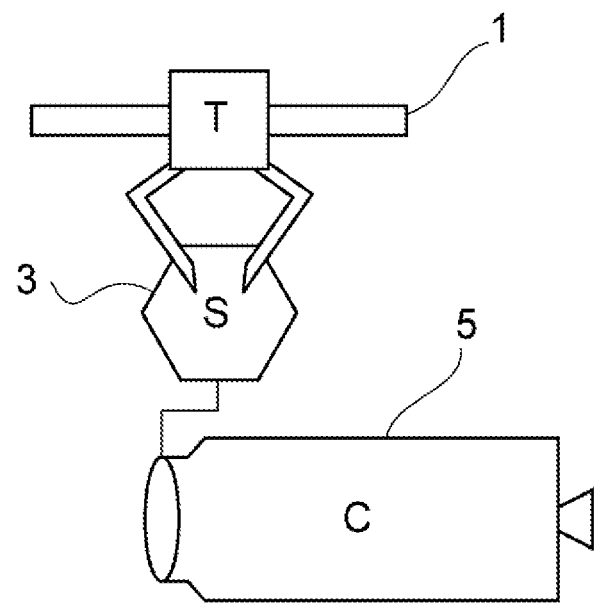
FIG. 4 illustrates the tug bringing the servicer attached to the client to a lower orbit.

FIG. 4 illustrates tug 1 bringing services 3 attached to client 5 to a lower orbit.

If tug 1 generates thrust in the opposite direction to its current direction of motion, tug 1, servicer 3, and client 5 can drop into a lower-energy elliptical transfer orbit. Tug 1 can then generate thrust to insert rug 1, servicer 3, and client 5 into a corresponding lower-energy circular orbit. Conversely, if tug 1 generates thrust in the same direction as its current direction of motion, tug 1, servicer 3, and client 5 can rise into a higher-energy elliptical transfer orbit. Tug 1 can then generate thrust to insert tug 1, servicer 3, and client 5 into a corresponding higher-energy circular orbit.

In embodiments a Hohmann transfer orbit cyan provide one manner of moving tug 1, servicer 3, and client 5 into a higher or lower orbit. A Hohmann transfer orbit is tangent to both the current orbit of tug 1, servicer 3, and client 5 and a desired orbit. A change of orbit is initiated by propulsion of tug 1, servicer 3, and client 5 in the direction of motion to accelerate tug 1, servicer 3, and client 5 along the elliptical Hohmann transfer orbit if going to a higher orbit, or by propulsion against the direction of motion to decelerate tug 1, servicer 3, and client 5 if transition to a lower orbit is desired. When tug 1, servicer 3, and client 5 arrive at the point of tangency between the Hohmann transfer orbit and the desired orbit, tug 1, servicer 3, and client 5 can accelerate to change its motion so that tug 1, servicer 3, and client 5 travel in the desired orbit.

As used herein, lower orbit means an orbit with lower altitude when measured from the center of the Earth, and higher orbit means are orbit with higher altitude when measured from the center of the Earth. Orbits can be described and classified according to a number of classification systems. A low-Earth orbit (LEO) is an Earth-centred orbit with an altitude of 2,000 km (about 1,200 mi) or less. Higher orbit classes include medium Earth orbits, sometimes called intermediate circular orbits (ICO), and further above, geostationary orbits. An object in geostationary orbit moves at the same angular velocity as the rotation of the Earth, and so from the vantage point of the surface of Earth remains at a single point in the sky. A high Earth orbit is a geocentric orbit with an altitude entirely above that of a geosynchronous us orbit (35,786 kilometres (22,236 mi)).

Objects in low altitude orbits (below about 500 km) are affected by atmospheric drag. Atmospheric drag reduces the kinetic energy of orbiting objects, so that the objects correspondingly decrease in altitude until re-entering the atmosphere. Atmospheric drag can thus remove objects from orbit without human intervention. Objects in lower orbits will be affected to a greater degree by atmospheric drag and will accordingly decay faster. The decay lifetime of a space object depends on its altitude, the level of solar activity, and the object's mass to cross-sectional area. Objects with a large mass to area ratio will decay more slowly as they are less affected by drag. High solar activity increases the density of the atmosphere and atmospheric drag in low Earth orbits. For objects orbiting at relatively low altitudes, atmospheric drag can be sufficiently strong to cause a re-entry before the intended end of mission if orbit raising maneuvers are not executed from time to tune. On the average, if client 5 is in an initial 300 km high orbit, client 5 will have a decay lifetime of only a few months. If client 5 is in a 500 km orbit, its lifetime will be around 10 years, and if client 5 is at 1000 km altitude client 5 can stay in orbit for thousands of years without the intervention of outside forces acting upon client 5.

In some embodiments, rather than moving client. S to a lower orbit, the complex formed by tug 1 and servicer 3 move client 5 to a higher orbit known as a graveyard, junk, or disposal orbit. For satellites in geostationary orbit and geosynchronous orbits, the graveyard orbit is a few hundred kilometers above the operational orbit.

Figure 5:
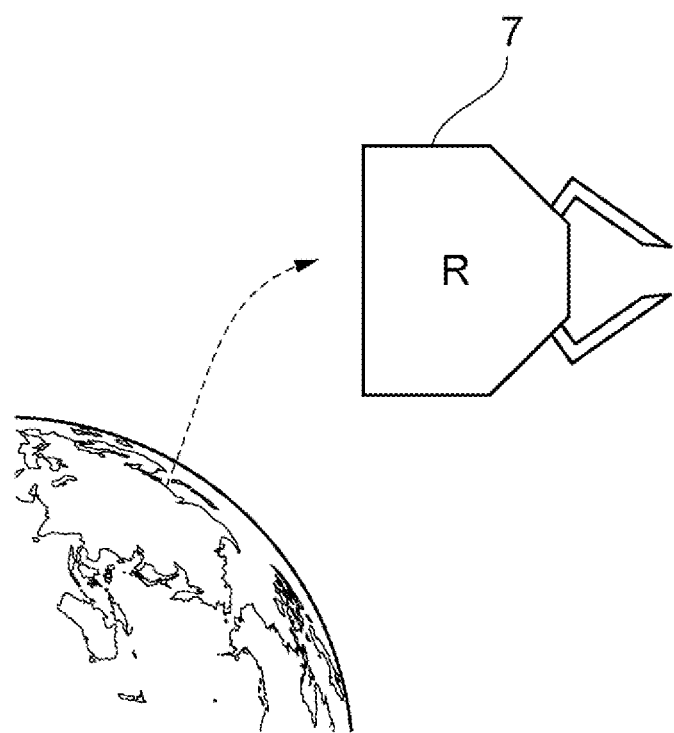
FIG. 5 illustrates the launch of a reentry shepherd.

In FIG. 5, reentry shepherd 7 is launched.

In embodiments, reentry shepherd 7 can be designed to provide guidance, control, and/or thrust to a debris object for the specific purpose of targeted atmospheric reentry. Reentry shepherd 7 can accordingly be equipped with chemical or electric propulsion systems. In some embodiments, reentry shepherd 7 may be outfitted with attachments which can be applied to a client in order to increase atmospheric drag. Drag devices can increase the cross-sectional area of a satellite to cause the atmosphere to slow the satellite and lower the satellite's altitude, but these devices may not assure a particular re-catty location such as the South Pacific Ocean Uninhabited Area.

Reentry shepherd 7 could be anywhere from a few hundred kg to a couple of tons in mass. Debris objects around 3 tons will require a smaller reentry shepherd than debris objects that are 8 tons, for example. The design of reentry shepherd 7 is assumed to be based on the kick stages of launch vehicles, such as the Photon by Rocket Lab. or Fregat by Soyuz. The last stage of typical launch vehicles has significant thrust (hundreds of Newtons) which helps with reentry burns because a large amount of impulse must be imparted quickly. The final reentry process cannot take more than one burn because the final maneuver usually must lower the perigee from ~180 km to 50 km to be successful. Having a perigee between those altitudes will usually result in a loss of control of due to aerodynamic disturbances, but not an immediate atmospheric reentry and thus a mission failure. A large thruster helps make sure a single burn will impart enough impulse to sufficiently change the perigee.

Reentry shepherd 7 will typically have a mass in between the tug and servicer. Reentry shepherd 7 does not need the agility of servicer 3, and does not need the longevity and fuel efficiency of tug 1. Reentry shepherd 7 just needs substantial impulse and thrust. Reentry shepherd 7 is envisioned to be an augmented kick stage of launch vehicles. It is possible that that all three vehicles—tug 1, servicer 3, and reentry shepherd 7—could be launched together in some embodiments, while in others they can all be launched separately. The architecture is flexible. Reentry shepherd 7 could also be launched several months after the tug and servicer, waiting for an optimal time to bring client 5 down from a higher altitude to lower altitude. This allows some flexibility in development, deployment, and operation timelines, as deploying multiple spacecraft at the same time can be burdensome. Having the architecture be configurable in different ways also allows for flexibility in launch vehicle selection.

Figure 6:
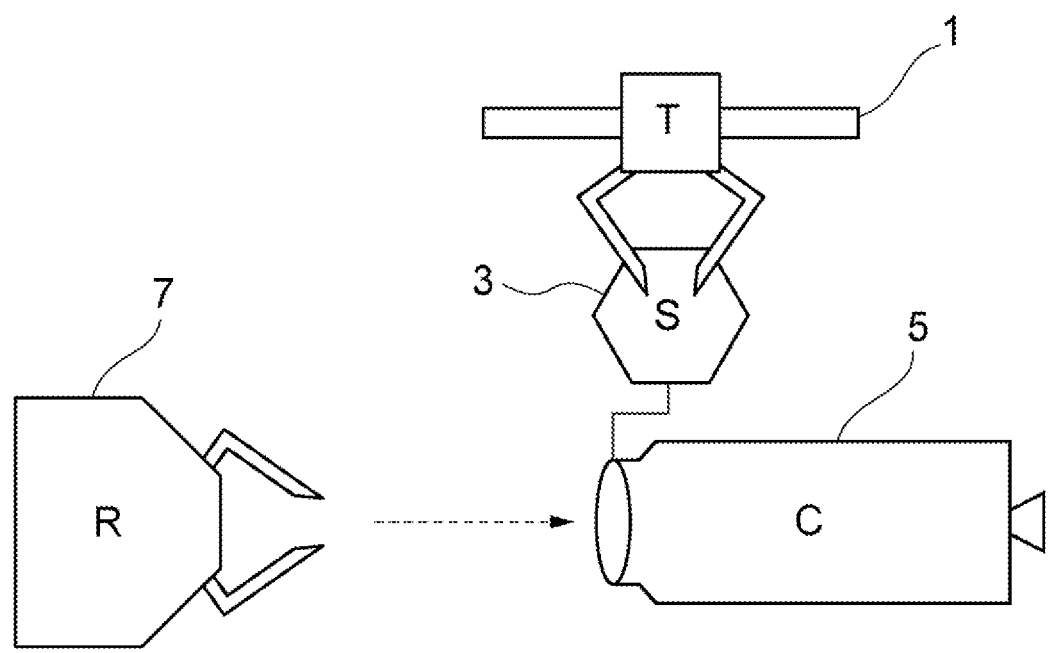
FIG. 6 illustrates the reentry shepherd docking with the client, which is held stable by the servicer attached to the tug.

FIG. 6 illustrates reentry shepherd 7 docking with client 5, which is held stable by servicer 3 attached to tug 1.

Client 5 can be held stable by means of magnetic, mechanical, or other forces. Servicer 3 can for example include permanent magnets to facilitate holding alter successful docking. Magnetic force can be generated in servicer 3 using super-conducting wires caroled to cryogenic temperatures. Client 5 may have on-board magnets intended to adjust the orientation of client 5 using Earth's magnetic field which can be utilized by servicer 3 for the purpose of attracting or repelling client 5 or to shift the orbit of client 5. Servicer 3 may also be equipped with robotic arms or other mechanical means for holding client 5.

Docking servicer 3 with client 5 may be difficult, but after servicer 3 has control, subsequent docking operations will be simplified. Servicer 3 can grasp a small section of client 5, and leave significant area for another spacecraft, such as reentry shepherd 7, to approach and grasp that same interface. This can be achieved by extending the robotic arm of servicer 3 which allows servicer 3 to get out of the way of another approaching spacecraft, as depicted in FIG. 6. In this operation, servicer 3 could even provide optical guidance to reentry shepherd 7 via retroreflectors or LEDs positioned on a robotic arm or end-effector of servicer 3. As client. 5 may not have optical fiducials which aid docking, the ability of servicer 3 to provide this guidance to reentry shepherd 7 is a significant advantage.

Figure 7:
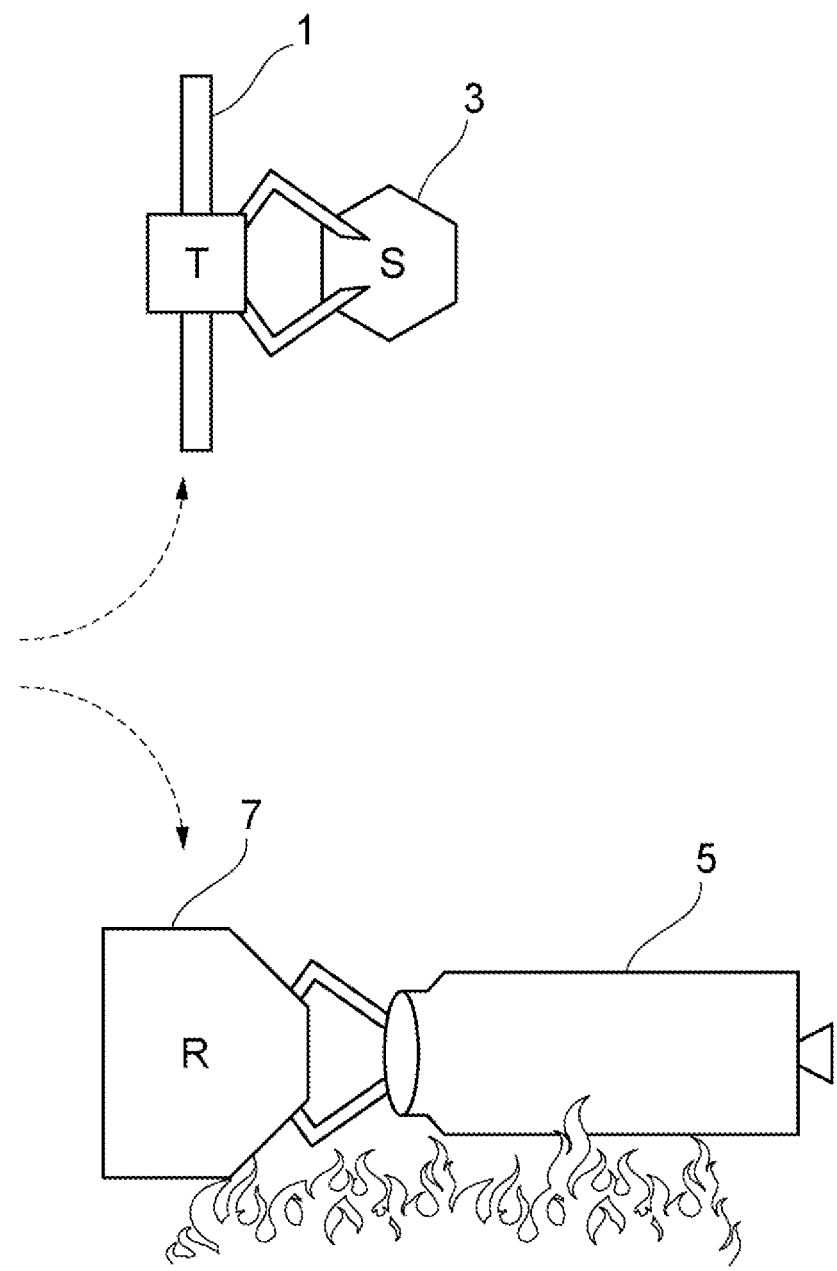
FIG. 7 illustrates separation of the servicer attached to the tug from the client attached to the reentry shepherd.

FIG. 7 illustrates separation of servicer 3 attached to tug 1 from client 5 attached to reentry shepherd 7. Tug 1 and servicer 3 accelerate in the direction of a next client object. Reentry shepherd 7 uses drag to lower the orbit of client 5 until the orbit is low enough for direct reentry burn.

In an ideal case, client 5 is vaporized entirely during transit through the atmosphere. Heat from the friction of the gasses in Earth's atmosphere burns up client 5 as client 5's altitude decreases. An approximate rule-of-thumb is that the air temperature in Kelvin around client 5 is equal to the entry speed in meters per second. Thus, at an orbital reentry velocity of 7800 m/s, the temperature may be as high as 7800 K. However, in embodiments, some pieces of client 5 may withstand even this high temperature to reach the surface of Earth and pose a risk of damage to persons and property on the ground.

Some components of client 5 (especially parts which are made of heat resistant materials like titanium) can survive atmospheric re-entry and fall down to Earth. In that case, it may be desirable for reentry shepherd 7 to escort client 5 to a position which will result in reentry over uninhabited areas of the Earth. In embodiments, reentry shepherd 7 can target a particular atmospheric entry point, in order to reduce the likelihood of casualties to persons or property on the surface of the earth. If client. 5 has maneuvering capability and still has remaining fuel at the end of its life, client 5 can positioned 30 that client 5 reenters over a lame area of ocean. If client. 5 does not have maneuvering capability and remaining fuel, a new reentry shepherd must be used for each client 5 requiring direct atmospheric reentry, to provide the guidance and control of client 5 required during reentry.

Reentry shepherd 7 may be reusable in the case where client 5 does not need guidance and control once being placed on the desired reentry trajectory intersecting earth. In some embodiments, reentry shepherd 7 could provide a reentry burn at apogee, then undock from client 5, and quickly raise its altitude before it reaches perigee. This maneuver process may have to take a fraction of an orbit period and may have to be automated. Reentry shepherd 7 may use chemical propulsion in this maneuver, most likely biprop, with a thrust of at least 400 N. If reentry shepherd 7 undocks from client 5, significant precision would be required on the reentry burn to ensure the target corridor in the Pacific Ocean is hit. After recovery, reentry shepherd 7 would likely remain at a low orbit, waiting for the next client. Reentry shepherd 7 could potentially be carried by tug 1 to a different altitude.

Tug 1 and servicer 3 are designed to be reused multiple times for multiple clients and can be used with or without the reentry shepherd 7, as some clients may not require direct atmospheric reentry. This reusability of both of these highly capable platforms helps to reduce the cost of disposal per object.

Figure 8:
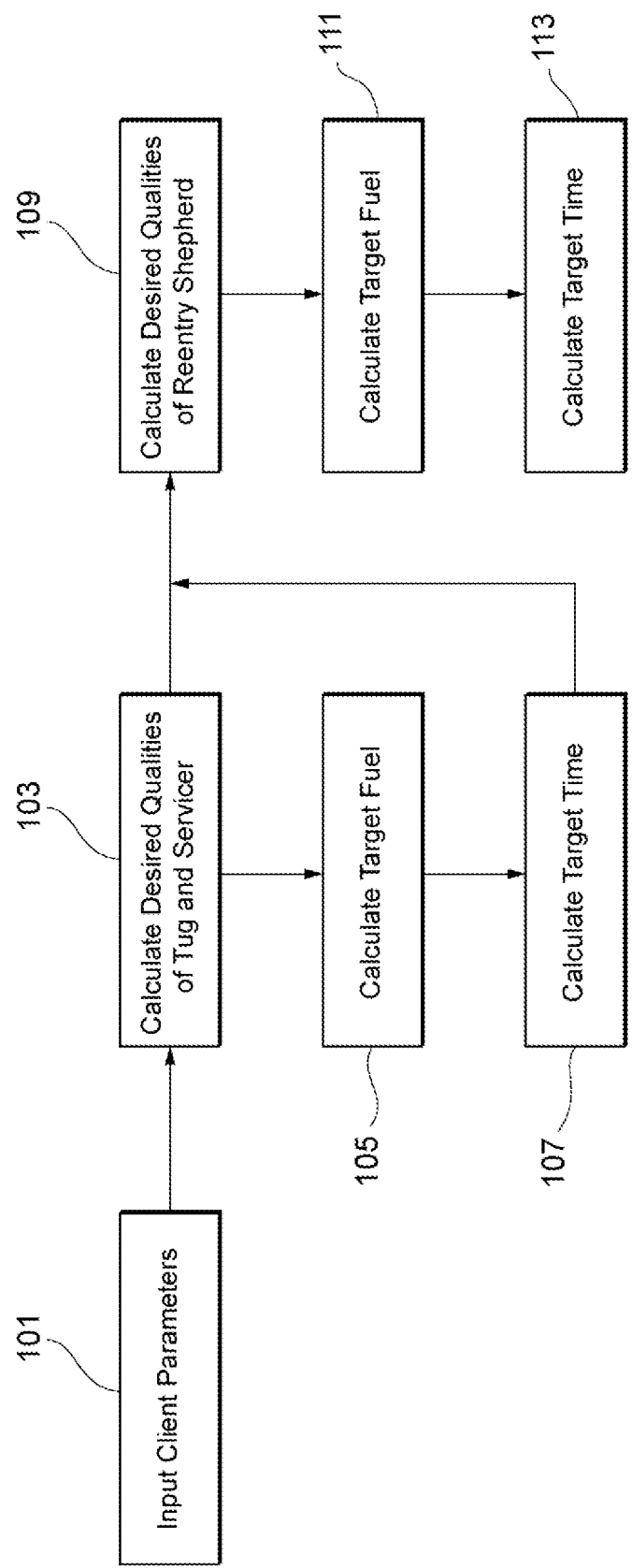
FIG. 8 is a flow chart illustrating each step in the method for rendezvous, capture, and disposal of an orbiting object that is the subject of the embodiment.

FIG. 8 is a flow chart illustrating steps in a computer-implemented method of designing spacecraft useful for rendezvous, capture, and disposal of an orbiting object that is the subject of one embodiment. In embodiments, many variations on this method are possible, and in fact it is likely that the order of steps may be changed from one embodiment to another.

One embodiment is computer-implemented method of calculating parameters of a spacecraft comprising: inputting, via one or more devices 101, attributes of one or more target clients; and calculating, at one or more processors 103, desired qualities of one or more tugs and/or one or more servicers according to a ranking previously defined. Devices can be various computer hardware such as a mouse, a keyboard, or various memory types.

Desired qualities can be various design and aeronautical parameters associated with the projected performance of a tug and/or a servicer. Thus, output of desired qualities can provide useful information about manufacturing processes for tugs and servicers, including materials used, sizes of components and assemblies, and shapes of components and assemblies. As well, reentry shepherds can be constructed according to desired qualities output from embodiments.

Desired qualities can be output in various data formats, including various spreadsheet and various word processing programs, as well as various file formats which can be used in Computer-Aided Design.

Previously defined rankings can weight, in response to data received about a client, different design and aeronautical parameters in different amounts according to mission objectives associated with rendezvous and disposal with that client. Previously defined rankings can be input via an I/O device such as a keyboard, mouse, or memory.

Other embodiments can comprise calculating 105 target weights of a fuel for one or more of the tug, servicer, and reentry shepherd. Still other embodiments can comprise calculating 107 a target time of one or more of launch, rendezvous and disposal of among one or more of tugs, servicers, reentry shepherds and clients.

Computer hardware such as a processor useful for implementing an embodiment may also be equipped for calculating 109 desired qualities of a reentry shepherd according to a ranking previously defined. In embodiments desired qualities of one or more reentry shepherds can but need not be calculated at the same time. In other words, step 109 can occur simultaneously with steps 101 and 103, or step 109 can occur later, and then can be followed by step 111 and step 113.

The embodiments described above are given for the purpose of facilitating the under standing of the present invention and does not intend to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

The invention claimed is:

1. A method for rendezvous with an orbiting object comprising:
   launching a tug servicer into a first client orbit;
   docking the servicer with a client;
   using the tug servicer, bringing the client from the first client orbit to a second client orbit; and
   attaching a reentry shepherd, operating in the second client orbit, to the client.

2. The method according to claim 1, further comprising detumbling the client using the reentry shepherd.

3. The method according to claim 1, further comprising undocking the tug servicer from the client.

4. The method according to claim 1, further comprising bringing, by the tug servicer, the client to a desired third orbit.

5. The method according to claim 1, further comprising docking the reentry shepherd with the client.

6. The method according to claim 5, further comprising guiding and controlling, by the reentry shepherd, the client during atmospheric reentry.

7. The method according to claim 5, further comprising separating the reentry shepherd from the client.

8. The method according to claim 1, further comprising placing, by the reentry shepherd, the client on a desired reentry trajectory intersecting Earth.

9. The method according to claim 1, further comprising refueling the client.

10. The method according to claim 1, further comprising repairing the client.

11. The method according to claim 1, further comprising altering the orbit of the client by the reentry shepherd.

12. The method according to claim 1, further comprising joining one or more components to the client.

13. The method according to claim 1, further comprising:
   the servicer portion closing a high-bandwidth data link to the tug portion using an omni-directional antenna, and
   the tug portion acting as an intermediary comms relay, establishing a high-bandwidth link to the ground with a directional antenna on the tug.

14. A system for rendezvous with an orbiting object comprising:
   a first spacecraft comprising a tug servicer capable of towing a client spacecraft from a first client orbit to a second client orbit,
   wherein a servicer portion of the tug servicer is configured to dock with the client spacecraft when the client is tumbling: and
   a reentry shepherd configured to dock with the client spacecraft in the second client orbit.

15. The system according to claim 14, wherein a servicer portion of the tug servicer is equipped with an omni-directional antenna and a tug portion of the tug servicer is equipped with a directional antenna.

16. The system according to claim 14, wherein the reentry shepherd is configured to guide the client spacecraft on a desired trajectory.

17. The system according to claim 14, wherein the reentry shepherd is reusable.

* * * * *